US010769406B2

(12) United States Patent
Lin et al.

(10) Patent No.: US 10,769,406 B2
(45) Date of Patent: Sep. 8, 2020

(54) NON-DIRECTIONAL FINGERPRINT AND PALMPRINT IDENTIFICATION METHOD AND NON-DIRECTIONAL FINGERPRINT AND PALMPRINT DATA CREATION METHOD

(71) Applicant: KEYCORE TECHNOLOGY CORP., Zhubei, Hsinchu County (TW)

(72) Inventors: Wei-Cheng Lin, Zhubei (TW); Ye-Lee Chen, Zhubei (TW); Shih-Hsiu Tseng, Zhubei (TW); Chien-Jen Hsiao, Zhubei (TW)

(73) Assignee: KEYCORE TECHNOLOGY CORP., Zhubei (TW)

( * ) Notice: Subject to any disclaimer, the term of this patent is extended or adjusted under 35 U.S.C. 154(b) by 159 days.

(21) Appl. No.: 15/924,266

(22) Filed: Mar. 18, 2018

(65) Prior Publication Data
US 2019/0286877 A1 Sep. 19, 2019

(51) Int. Cl.
G06K 9/00 (2006.01)
(52) U.S. Cl.
CPC ..... *G06K 9/00067* (2013.01); *G06K 9/00013* (2013.01); *G06K 9/00087* (2013.01)
(58) Field of Classification Search
None
See application file for complete search history.

(56) References Cited

U.S. PATENT DOCUMENTS

| | | | | |
|---|---|---|---|---|
| 2003/0118215 | A1* | 6/2003 | Mizoguchi | G06K 9/00013 382/115 |
| 2004/0170303 | A1* | 9/2004 | Cannon | G06K 9/00013 382/115 |
| 2004/0264742 | A1* | 12/2004 | Zhang | G06K 9/00067 382/115 |
| 2013/0336549 | A1* | 12/2013 | Black | G06F 21/32 382/124 |
| 2015/0035961 | A1* | 2/2015 | Chen | G06K 9/00067 348/77 |
| 2015/0356362 | A1* | 12/2015 | Demos | G06K 9/00885 382/115 |
| 2016/0210493 | A1* | 7/2016 | Walch | G06K 9/00013 |
| 2017/0255810 | A1* | 9/2017 | Liu | G06F 3/0412 |

\* cited by examiner

*Primary Examiner* — Hadi Akhavannik
(74) *Attorney, Agent, or Firm* — Thomas J. Nikolai; DeWitt LLP

(57) ABSTRACT

A non-directional fingerprint and palmprint identification method and a non-directional fingerprint and palmprint data creation method. In the fingerprint and palmprint identification method, a fingerprint and palmprint identification device detects and scans the fingerprints and palmprint of a user to generate a fingerprint and palmprint image and transmit the image to a processor. The processor identifies and calculates the fingerprint and palmprint image to obtain the fingerprint of a specific finger and the palmprint. According to at least one reference line and the fingerprint of the specific finger and the palmprint, the processor identifies and processes the intersection points to generate multiple intersection points. Then the processor calculates and processes the distances between the intersection points to generate multiple characteristic points and converts the characteristic points into digitalized characteristic data to compare the characteristic data with the characteristic data stored in a characteristic database to generate a comparison result.

18 Claims, 13 Drawing Sheets

```
┌─────────────────────────────────────────────────────┐
│ using a fingerprint and palmprint identification    │
│ device to detect and scan the fingerprints and      │
│ palmprint of a user to generate a fingerprint and   │──S1
│ palmprint image and transmit the image to a         │
│ processor                                           │
└─────────────────────────────────────────────────────┘
                          │
                          ▼
┌─────────────────────────────────────────────────────┐
│ the processor processing the fingerprint and        │──S2
│ palmprint image to generate a processed             │
│ fingerprint and palmprint image                     │
└─────────────────────────────────────────────────────┘
                          │
                          ▼
┌─────────────────────────────────────────────────────┐
│ the processor identifying and calculating the       │
│ fingerprint and palmprint image to obtain a trough  │
│ point between each two fingers of the fingerprint   │
│ and palmprint image and according to the trough     │
│ point, the processor identifying and taking out a   │──S3
│ specific finger between two adjacent trough points  │
│ of the fingerprint and palmprint image and          │
│ selecting at least one reference line on the        │
│ specific finger, which extends to bottom end of     │
│ the palm                                            │
└─────────────────────────────────────────────────────┘
                          │
                          ▼
┌─────────────────────────────────────────────────────┐
│ the processor identifying and calculating the       │
│ fingerprint and palmprint image to obtain the       │
│ fingerprint of the specific finger and the          │──S4
│ palmprint and according to the at least one         │
│ reference line and the fingerprint of the specific  │
│ finger and the palmprint, the processor             │
│ identifying and processing the intersection points  │
│ to generate multiple intersection points            │
└─────────────────────────────────────────────────────┘
                          │
                          ▼
┌─────────────────────────────────────────────────────┐
│ the processor calculating and processing the        │──S5
│ distances between the intersection points to        │
│ generate multiple characteristic points and         │
│ converting the characteristic points into           │
│ digitalized characteristic data to compare the      │
│ characteristic data with the characteristic data    │
│ stored in a characteristic database to generate a   │
│ comparison result                                   │
└─────────────────────────────────────────────────────┘
```

Fig. 2

```
┌─────────────────────────────────────────────────────┐
│ using a fingerprint and palmprint identification    │
│ device to detect and scan the fingerprints and      │
│ palmprint of a user to generate a fingerprint and   │──S1
│ palmprint image and transmit the image to a         │
│ processor                                           │
└─────────────────────────────────────────────────────┘
                          │
                          ▼
┌─────────────────────────────────────────────────────┐
│ the processor processing the fingerprint and        │──S2
│ palmprint image to generate a processed             │
│ fingerprint and palmprint image                     │
└─────────────────────────────────────────────────────┘
                          │
                          ▼
┌─────────────────────────────────────────────────────┐
│ the processor identifying and calculating the       │
│ fingerprint and palmprint image to obtain a trough  │
│ point between each two fingers of the fingerprint   │
│ and palmprint image and according to the trough     │
│ point, the processor identifying and taking out a   │──S3
│ specific finger between two adjacent trough points  │
│ of the fingerprint and palmprint image and          │
│ selecting at least one reference line on the        │
│ specific finger, which extends to bottom end of     │
│ the palm                                            │
└─────────────────────────────────────────────────────┘
                          │
                          ▼
┌─────────────────────────────────────────────────────┐
│ the processor identifying and calculating the       │
│ fingerprint and palmprint image to obtain the       │
│ fingerprint of the specific finger and the          │──S4
│ palmprint and according to the at least one         │
│ reference line and the fingerprint of the specific  │
│ finger and the palmprint, the processor             │
│ identifying and processing the intersection points  │
│ to generate multiple intersection points            │
└─────────────────────────────────────────────────────┘
                          │
                          ▼
┌─────────────────────────────────────────────────────┐
│ the processor calculating and processing the        │──S5
│ distances between the intersection points to        │
│ generate multiple characteristic points and         │
│ converting the characteristic points into           │
│ digitalized characteristic data and storing the     │
│ digitalized characteristic data into a              │
│ characteristic database for storage or reading      │
│ and use                                             │
└─────────────────────────────────────────────────────┘
```

Fig. 6

| using a fingerprint and palmprint identification device to detect and scan the fingerprints and palmprint of a user to generate a fingerprint and palmprint image and transmit the image to a processor | S1 |

| the processor processing the fingerprint and palmprint image to generate a processed fingerprint and palmprint image | S2 |

| the processor identifying and calculating the fingerprint and palmprint image to obtain a trough point between each two fingers of the fingerprint and palmprint image and according to the trough point, the processor identifying and taking out a specific finger between two adjacent trough points of the fingerprint and palmprint image and selecting multiple reference lines on the specific finger, which extend to bottom end of the palm | S3 |

| the processor identifying and calculating the fingerprint and palmprint image to obtain the fingerprint of the specific finger and the palmprint and according to the reference lines and the fingerprint and multiple phalangeal configurations of the specific finger and multiple major lines of the palmprint, the processor identifying and processing the intersection points to generate multiple intersection points | S4 |

| the processor calculating and processing the distances between the intersection points to generate multiple characteristic points and converting the characteristic points into digitalized characteristic data to compare the characteristic data with the characteristic data stored in a characteristic database to generate a comparison result | S5 |

Fig. 8

```
┌─────────────────────────────────────────────────────────┐
│ using a fingerprint and palmprint identification device │
│ to detect and scan the fingerprints and palmprint of a  │──S1
│ user to generate a fingerprint and palmprint image and  │
│ transmit the image to a processor                       │
└─────────────────────────────────────────────────────────┘
                            ▼
┌─────────────────────────────────────────────────────────┐
│ the processor processing the fingerprint and palmprint  │──S2
│ image to generate a processed fingerprint and palmprint │
│ image                                                   │
└─────────────────────────────────────────────────────────┘
                            ▼
┌─────────────────────────────────────────────────────────┐
│ the processor identifying and calculating the           │
│ fingerprint and palmprint image to obtain a trough      │
│ point between each two fingers of the fingerprint and   │
│ palmprint image and according to the trough point, the  │──S3
│ processor identifying and taking out a specific finger  │
│ between two adjacent trough points of the fingerprint   │
│ and palmprint image and selecting multiple reference    │
│ lines on the specific finger, which extend to bottom    │
│ end of the palm                                         │
└─────────────────────────────────────────────────────────┘
                            ▼
┌─────────────────────────────────────────────────────────┐
│ the processor identifying and calculating the           │
│ fingerprint and palmprint image to obtain the           │
│ fingerprint of the specific finger and the palmprint    │──S4
│ and according to the reference lines and the            │
│ fingerprint and multiple phalangeal configurations of   │
│ the specific finger and multiple major lines of the     │
│ palmprint, the processor identifying and processing the │
│ intersection points to generate multiple intersection   │
│ points                                                  │
└─────────────────────────────────────────────────────────┘
                            ▼
┌─────────────────────────────────────────────────────────┐
│ the processor calculating and processing the distances  │──S5
│ between the intersection points to generate multiple    │
│ characteristic points and converting the characteristic │
│ points into digitalized characteristic data and storing │
│ the digitalized characteristic data into a              │
│ characteristic database for storage or reading and use  │
└─────────────────────────────────────────────────────────┘
```

Fig. 9

NON-DIRECTIONAL FINGERPRINT AND PALMPRINT IDENTIFICATION METHOD AND NON-DIRECTIONAL FINGERPRINT AND PALMPRINT DATA CREATION METHOD

BACKGROUND OF THE INVENTION

1. Field of the Invention

The present invention relates generally to a non-directional fingerprint and palmprint identification method and a non-directional fingerprint and palmprint data creation method, and more particularly to a non-directional fingerprint and palmprint identification method, which can non-directionally identify the fingerprint and palmprint of a user's hand to speed the fingerprint and palmprint identification.

2. Description of the Related Art

Biological identification technique is always an important topic of the development of security technique. The often seen biological identification techniques include retina, iris and face identification techniques as seen in the movies and fingerprint, palmprint and voice pattern identification techniques, which have been very popularly used. Among these biological identification techniques, the fingerprint identification technique is the most often seen biological identification technique for its highest uniqueness, convenience and specificity.

In order to enhance the security of fingerprint identification, the palmprint identification technique is added to the fingerprint identification technique. In the conventional fingerprint and palmprint identification technique, a camera is aimed at ⅓ or ⅔ of the whole palm of an actual user and the whole palm of the user must be shown on a display screen of the camera. Moreover, the profile of the ⅓ or ⅔ of the whole palm of the user must be continuously adjusted until it precisely matches the profile of the whole virtual palm shown on the display screen. Then the camera will be activated to shoot the whole palm of the actual user and transmit the image of the whole palm to a processor. The processor first identifies and processes the fingerprint and palmprint image of the shot whole palm. Then, according to the identified and processed fingerprint and palmprint image, the processor compares the image with the fingerprint and palmprint image stored in a database corresponding to the fingerprint and palmprint image of the user. In case the comparison result is correct, this meaning the identity of the user is proved In case the comparison result is incorrect, this meaning the identity of the user is not proved. This can effectively achieve the object of identity identification.

In the conventional fingerprint and palmprint identification method, the camera is used to take the fingerprint and palmprint (the whole palm) image of the user in a non-contact manner for identification. This is securer than the simple fingerprint identification. However, a problem is derived from such fingerprint and palmprint identification method. That is, the identification and calculation manner of the conventional processor is quite complicated and the conventional processor takes longer time to complete the identification and calculation. For example, the user needs to continuously adjust the left and right direction of the camera and zoom in or out the camera for positioning the profile of the whole palm of the actual user in a true position matching the profile of the whole virtual palm shown on the display screen. Thereafter, the camera is activated to shoot. As a result, the data input time is quite long and the input comparison time is quite long as well as the identification and calculation process of the processor is quite complicated. This leads to increase of cost. In addition, the profile of the whole virtual palm shown on the display screen has a specific angle (such as 45 degrees) so that every finger of the whole palm of the user must be put in a position corresponding to the position of every finger of the profile of the whole virtual palm shown on the display screen. As a result, the fingerprints and palmprint of the user can be identified only by one single fixed angle. Moreover, in practice, it often takes place that the processor mis-judges the user to be someone else only because the opening angle or position of one of the fingers of the whole palm of the user is slightly different from the opening angle or position of one of the fingers of the profile of the whole virtual palm shown on the display screen. Therefore, the conventional fingerprint and palmprint identification method is inconvenient in use and the identification time of the conventional fingerprint and palmprint identification method is quite long. Also, the identification efficiency of the conventional fingerprint and palmprint identification method is poor.

Furthermore, in the conventional fingerprint and palmprint identification method, the camera is used to identify the whole palm of the user. A hacker can easily use a fake photo of the hand to cheat and crack the camera. Therefore, the data are apt to leak and the security is insufficient.

SUMMARY OF THE INVENTION

It is therefore a primary object of the present invention to provide a non-directional fingerprint and palmprint identification method and a non-directional fingerprint and palmprint data creation method, in which the fingerprints and palmprint (the whole palm) of a user's hand can non-directionally directly contact a fingerprint and palmprint identification device to identify the identity of the user.

It is a further object of the present invention to provide a non-directional fingerprint and palmprint identification method and a non-directional fingerprint and palmprint data creation method, in which the fingerprint and palmprint identification is speeded and the cost is saved.

It is still a further object of the present invention to provide a non-directional fingerprint and palmprint identification method and a non-directional fingerprint and palmprint data creation method, in which the identification and comparison time is effectively shortened and the security is enhanced.

To achieve the above and other objects, the non-directional fingerprint and palmprint identification method of the present invention includes steps of: using a fingerprint and palmprint identification device to detect and scan the fingerprints and palmprint of a user to generate a fingerprint and palmprint image and transmit the image to a processor; the processor processing the fingerprint and palmprint image to generate a processed fingerprint and palmprint image; the processor identifying and calculating the fingerprint and palmprint image to obtain a trough point between each two fingers of the fingerprint and palmprint image and according to the trough point, the processor identifying and taking out a specific finger between two adjacent trough points of the fingerprint and palmprint image and selecting at least one reference line on the specific finger, which extends to bottom end of the palm; the processor identifying and calculating the fingerprint and palmprint image to obtain the fingerprint of the specific finger and the palmprint and according to the at least one reference line and the fingerprint of the specific finger and the palmprint, the processor identifying and processing the intersection points to generate multiple intersection points; and the processor calculating and processing the distances between the intersection points to generate multiple characteristic points and converting the characteristic points into digitalized characteristic data to compare the characteristic data with the characteristic data stored in a characteristic database to generate a comparison result. By means of the design of the fingerprint and palmprint identification method of the present invention, the fingerprints and the palmprint of the whole palm of the hand can be non-directionally identified to speed the fingerprint and palmprint identification and save cost. In addition, the identification comparison time can be effectively shortened.

To achieve the above and other objects, the non-directional fingerprint and palmprint data creation method of the present invention includes steps of: using a fingerprint and palmprint identification device to detect and scan the fingerprints and palmprint of a user to generate a fingerprint and palmprint image and transmit the image to a processor; the processor processing the fingerprint and palmprint image to generate a processed fingerprint and palmprint image; the processor identifying and calculating the fingerprint and palmprint image to obtain a trough point between each two fingers of the fingerprint and palmprint image and according to the trough point, the processor identifying and taking out a specific finger between two adjacent trough points of the fingerprint and palmprint image and selecting at least one reference line on the specific finger, which extends to bottom end of the palm; the processor identifying and calculating the fingerprint and palmprint image to obtain the fingerprint of the specific finger and the palmprint and according to the at least one reference line and the fingerprint of the specific finger and the palmprint, the processor identifying and processing the intersection points to generate multiple intersection points; and the processor calculating and processing the distances between the intersection points to generate multiple characteristic points and converting the characteristic points into digitalized characteristic data and storing the digitalized characteristic data into a characteristic database for storage or reading and use. By means of the design of the fingerprint and palmprint data creation method of the present invention, the fingerprints and the palmprint of the whole palm of the hand can be non-directionally identified to speed the fingerprint and palmprint identification and save cost. In addition, the identification comparison time can be effectively shortened.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 2 is a flow chart of a first embodiment of the fingerprint and palmprint identification method of the present invention;

FIG. 6 is a flow chart of a first embodiment of the fingerprint and palmprint data creation method of the present invention;

FIG. 8 is a flow chart of the second embodiment of the fingerprint and palmprint identification method of the present invention; and FIG. 9 is a flow chart of a second embodiment of the fingerprint and palmprint data creation method of the present invention.

DETAILED DESCRIPTION OF THE PREFERRED EMBODIMENTS

Figure 1:
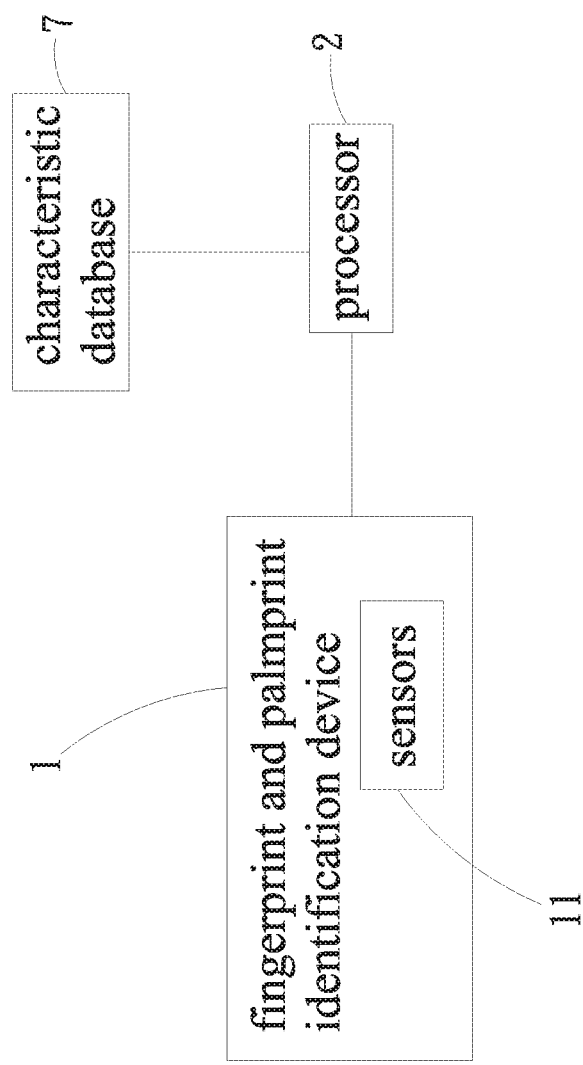
FIG. 1 is a block diagram of the use of the fingerprint and palmprint identification device of the present invention.
Figure 3A:
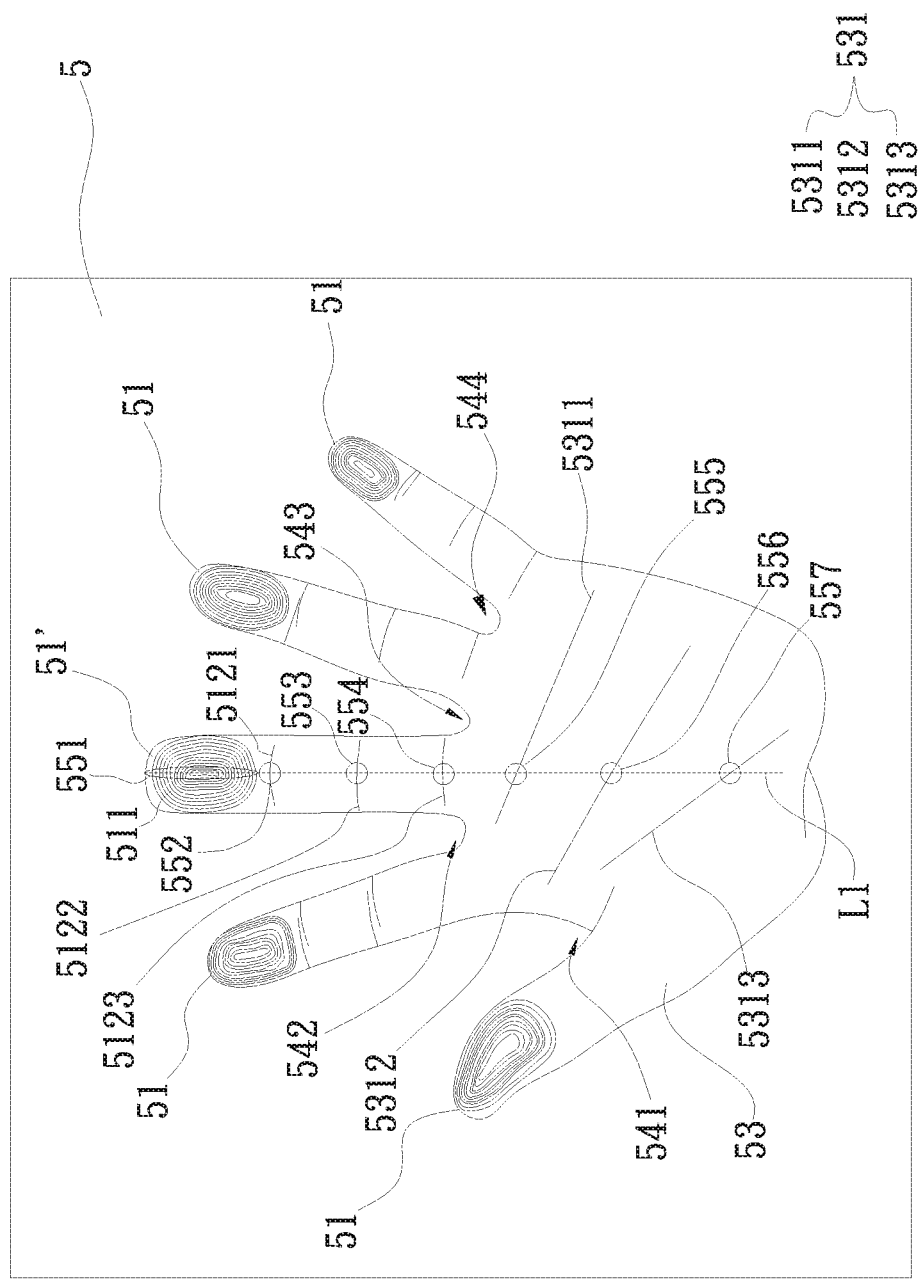
FIG. 3A is a view showing that in the first embodiment of the fingerprint and palmprint identification method of the present invention, the trough points between each two fingers, the reference line and the intersection points of the fingerprint and palmprint image are selected.
Figure 3B:
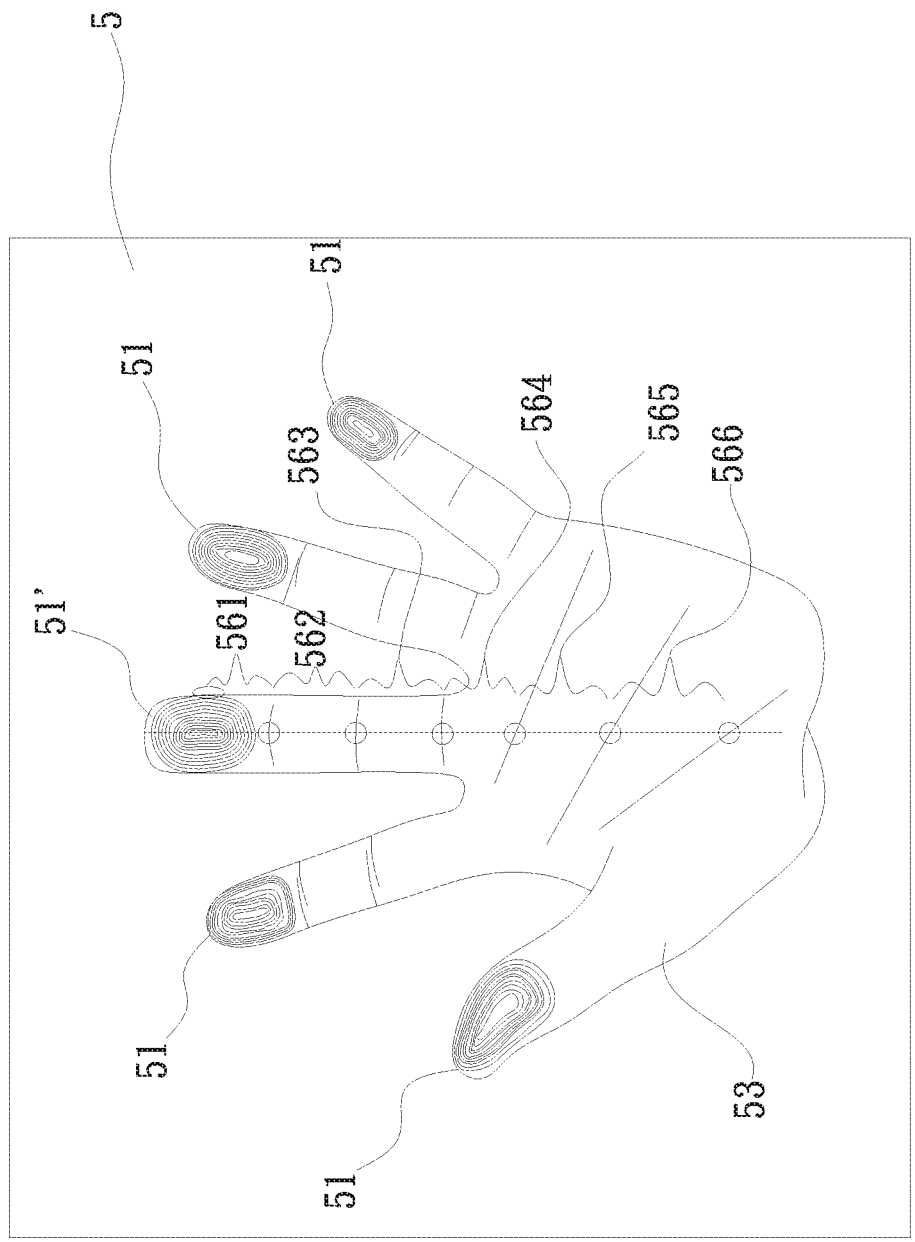
FIG. 3B is a view showing that in the first embodiment of the fingerprint and palmprint identification method of the present invention, the intersection points and the characteristic points of the fingerprint and palmprint image are selected.
Figure 4A:
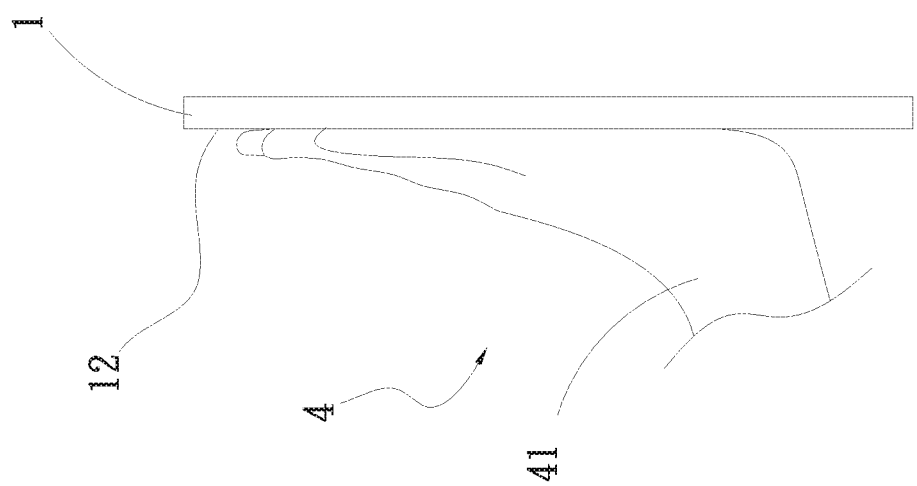
FIG. 4A is a view showing an operation of the fingerprint and palmprint identification device of the present invention.
Figure 5A:
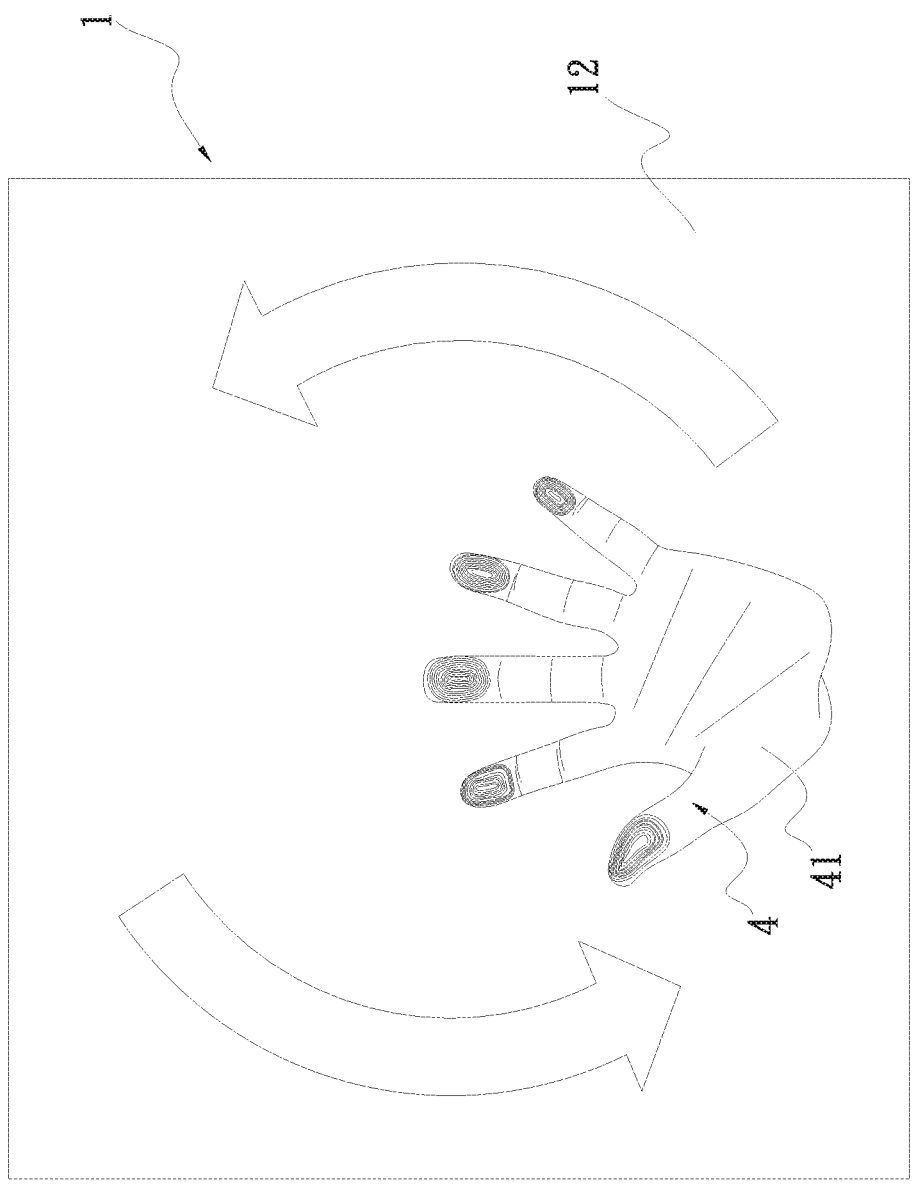
FIG. 5A is a view showing that a user's hand touches the fingerprint and palmprint identification device of the present invention in a direction.
Figure 5B:
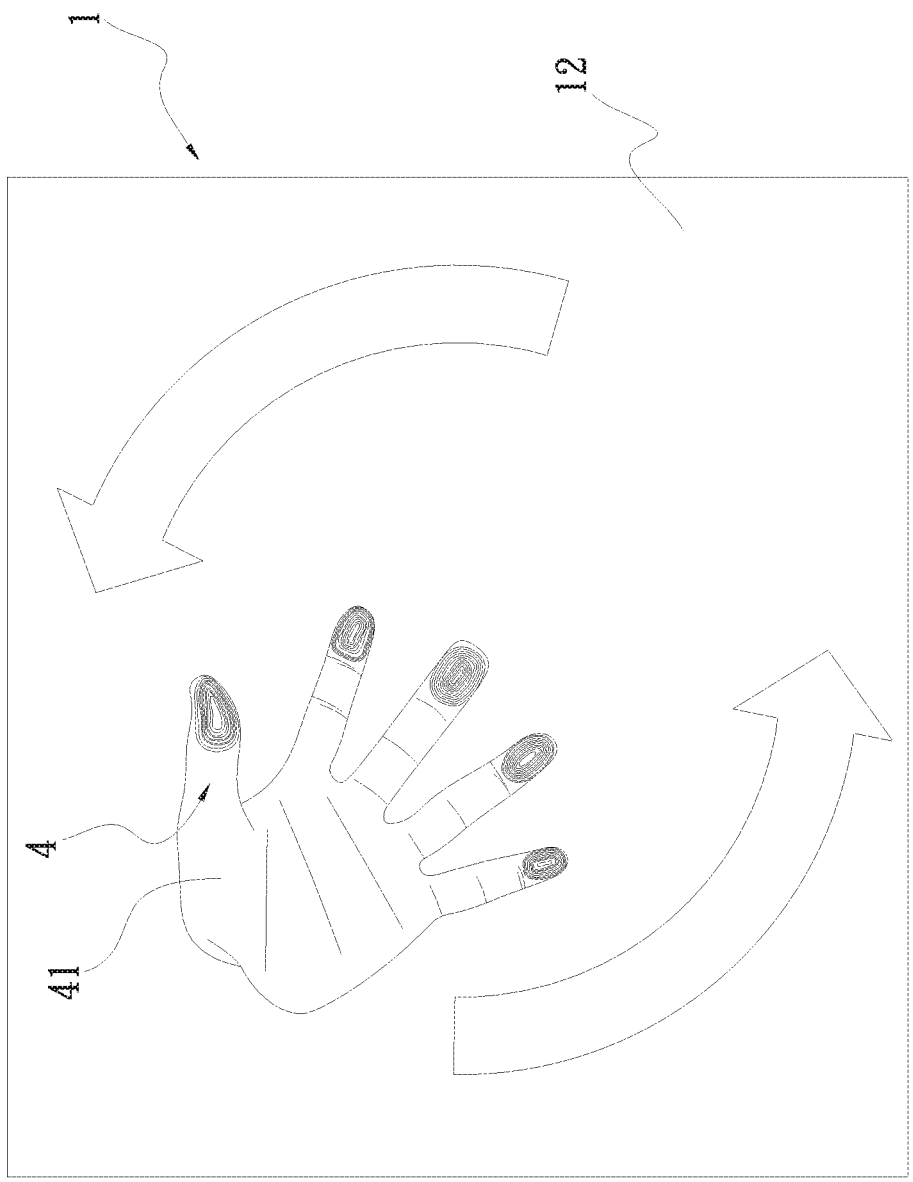
FIG. 5B is a view showing that a user's hand touches the fingerprint and palmprint identification device of the present invention in another direction.

Please refer to FIGS. 1, 2, 3A, 3B, 4A, 5A and 5B. FIG. 1 is a block diagram of the use of the fingerprint and palmprint identification device of the present invention. FIG. 2 is a flow chart of a first embodiment of the fingerprint and palmprint identification method of the present invention. FIG. 3A is a view showing that in the first embodiment of the fingerprint and palmprint identification method of the present invention, the trough points between each two fingers, the reference line and the intersection points of the fingerprint and palmprint image are selected. FIG. 3B is a view showing that in the first embodiment of the fingerprint and palmprint identification method of the present invention, the intersection points and the characteristic points of the fingerprint and palmprint image are selected. FIG. 4A is a view showing an operation of the fingerprint and palmprint identification device of the present invention. FIG. 5A is a view showing that a user's hand touches the fingerprint and palmprint identification device of the present invention in a direction. FIG. 5B is a view showing that a user's hand touches the fingerprint and palmprint identification device of the present invention in another direction. As shown in the drawings, the fingerprint and palmprint identification method of the present invention is applied to a fingerprint and palmprint identification device 1. In practice, the fingerprint and palmprint identification device 1 can be disposed on various products (such as a door, a vehicle dashboard or an ATM, not shown) or electronic products (such as an LED television, a notebook or a tablet, not shown). In this embodiment, the fingerprint and palmprint identification device 1 has the form of a plane face.

The fingerprint and palmprint identification device 1 has multiple sensors 11 and a contact face 12. The contact face 12 is a plane face disposed on a surface of the fingerprint and palmprint identification device 1 for all the palm of a hand 41 (such as right hand or left hand) of a user 4 to put on, attach to and contact the contact face 12. In this embodiment, the sensors 11 are capacitor fingerprint and palmprint sensors. The sensors 11 can be made of transparent conductive material such as indium tin oxide (ITO) or antimony tin oxide (ATO). The sensors 11 are positioned under the contact face 12 of the fingerprint and palmprint identification device 1 and electrically connected to a corresponding processor 2. The sensors 11 serve to detect and scan the fingerprints and palmprint, (that is, the whole palm) of the hand 41 of the user 4 in direct contact with the contact face 12 to generate a fingerprint and palmprint image and transmit the image to the processor 2. The whole palm of the hand 41 of the user 4 can non-directionally attach to and contact the corresponding contact face 12 (as shown in FIGS. 5A and 5B).

In addition, in practice, alternatively, the sensors 11 can be designed to be directly formed on a section of various products or electronic products themselves. For example, the sensors 11 can be directly formed on a middle section of a glass door such as by means of etching. Alternatively, the sensors 11 can be directly formed on a left section of the display face of an LED television such as by means of etching. The section of various products or electronic products themselves serves as a substrate material of the sensors 11, whereby the fingerprint and palmprint identification device 1 can be disposed on various products or electronic products as necessary.

Figure 4B:
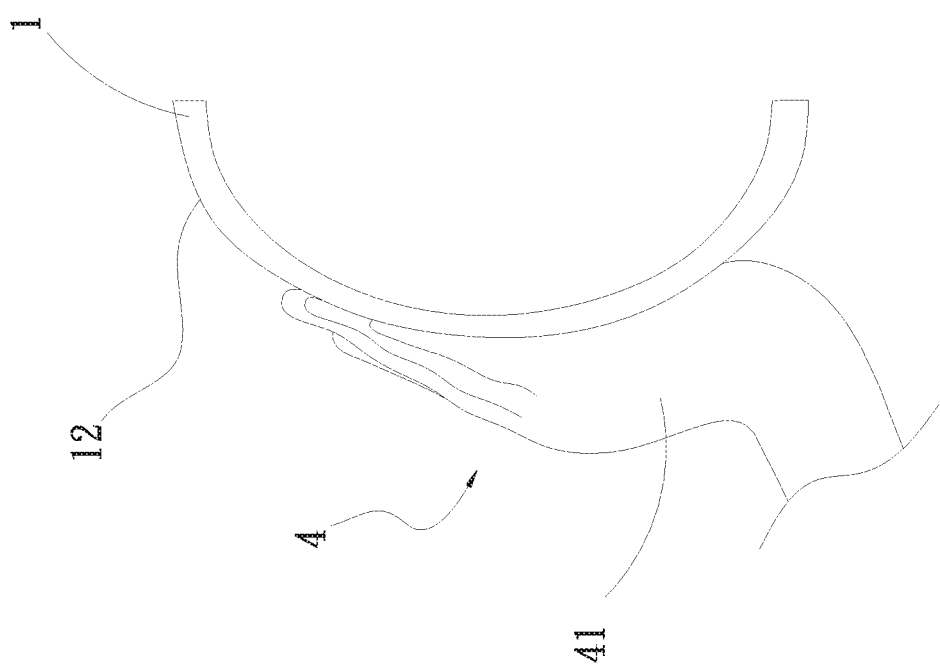
FIG. 4B is a view showing another operation of the fingerprint and palmprint identification device of the present invention.

Please refer to FIG. 4B, which is a view showing another operation of the fingerprint and palmprint identification device of the present invention. In another embodiment of the present invention, the fingerprint and palmprint identification device 1 can be designed as a flexible curved fingerprint and palmprint identification device 1. The contact face 12 is a curved face for the whole palm of a hand 41 (such as right hand or left hand) of a user 4 to put on, attach to and contact the contact face 12.

The processor 2 is a central processing unit (CPU) or a microcontroller unit (MCU). In this embodiment, the processor 2 is an independent component disposed outside the fingerprint and palmprint identification device 1. In addition, the processor 2 is electrically connected to the corresponding fingerprint and palmprint identification device 1 and a characteristic database 7. In this embodiment, the characteristic database 7 is a memory (such as a flash memory, a random access memory, a hard disk or a solid state disk) for reading or storing the characteristic data of a user 4.

In a modified embodiment, the processor 2 is alternatively a component inbuilt in the fingerprint and palmprint identification device 1, that is, the fingerprint and palmprint identification device 1 includes the processor 2 and the sensors 11.

Please now refer to FIGS. 2, 3A and 3B. The non-directional fingerprint and palmprint identification method of the present invention includes steps of:

S1. using a fingerprint and palmprint identification device to detect and scan the fingerprints and palmprint of a user to generate a fingerprint and palmprint image and transmit the image to a processor, the multiple sensors 11 (such as capacitor fingerprint and palmprint sensors) of the fingerprint and palmprint identification device 1 being used to detect and scan the fingerprints and palmprint, (that is, the whole left palm or the whole right palm) of the hand 41 of the user 4 in direct contact with the contact face 12 to generate the fingerprint and palmprint image and transmit the image to the processor 2;

S2. the processor processing the fingerprint and palmprint image to generate a processed fingerprint and palmprint image, the processor 2 receiving the fingerprint and palmprint image and processing the fingerprint and palmprint image, for example, removing the noise and background of the fingerprint and palmprint image (such as removing the noise and background of the image), Gaussian blurring the image (such as processing the edges of the image or Gaussian blurring the image), intelligent enhancing the image (such as enhancing and clarifying the profile of the image), binarizing the image (such as converting gray scale image into binary image) and thinning the image so as to generate the processed fingerprint and palmprint image 5;

S3. the processor identifying and calculating the fingerprint and palmprint image to obtain a trough point between each two fingers of the fingerprint and palmprint image and according to the trough point, the processor identifying and taking out a specific finger between two adjacent trough points of the fingerprint and palmprint image and selecting at least one reference line on the specific finger, which extends to bottom end of the palm, the processor 2 identifying and calculating the fingerprint and palmprint image 5 to obtain the trough points between each two fingers 51 of the fingerprint and palmprint image 5, the trough points including a first trough point 541, a second trough point 542, a third trough point 543 and a fourth trough point 544, in this embodiment, the first trough point 541 being, but not limited to, positioned between the thumb 51 and the index finger 51 of the hand 41 (left hand or right hand), the second trough point 542 being, but not limited to, positioned between the index finger 51 and the middle finger 51 of the hand 41, the third trough point 543 being, but not limited to, positioned between the middle finger 51 and the ring finger 51 of the hand 41, the fourth trough point 544 being, but not limited to, positioned between the ring finger 51 and the little finger 51 of the hand 41, according to the trough points, the processor 2 identifying and taking out a specific finger 51' (such as the middle finger of the hand 41) between the second and third trough points 542, 543 of the fingerprint and palmprint image 5 and selecting the reference line L1 on the specific finger 51', which extends from the middle of the tip of the specific finger 51' to the bottom end of the palm 53, in this embodiment, there being one reference line L1 extending from the middle of the specific finger 51' of the hand 41 to the bottom end of the palm 53 of the hand 41 in the fingerprint and palmprint image 5;

S4. the processor identifying and calculating the fingerprint and palmprint image to obtain the fingerprint of the specific finger and the palmprint and according to the at least one reference line and the fingerprint of the specific finger and the palmprint, the processor identifying and processing the intersection points to generate multiple intersection points, the processor 2 then identifying and calculating the fingerprint and palmprint image 5 to obtain the fingerprint 511 of the specific finger 51' and the palmprint 531 of the hand 41 in the fingerprint and palmprint image 5, according to the fingerprint 511 of the specific finger 51' intersecting the reference line L1 and the multiple phalangeal configurations of the specific finger 51' and the multiple major lines of the palmprint 531 in the fingerprint and palmprint image 5, the processor 2 identifying and processing the intersection points to generate the intersection points, in this embodiment, the phalangeal configurations of the specific finger 51' including a first phalangeal configuration 5121, a second phalangeal configuration 5122 and a third phalangeal configuration 5123, the major lines of the palmprint 531 including a first major line 5311, a second major line 5312 and a third major line 5313, the first major line 5311 such as the heart line being correspondingly positioned under the adjacent trough point, the second major line 5312 such as the wisdom line being positioned between the first major line 5311 and the third major line 5313, the third major line 5313 such as the fate line being correspondingly positioned under the second major line 5312, in addition, the intersection points including a fingerprint intersection point 551, a first phalangeal configuration intersection point 552, a second phalangeal configuration intersection point 553, a third phalangeal configuration intersection point 554, a first major line intersection point 555, a second major line intersection point 556 and a third major line intersection point 557, the first phalangeal configuration intersection point 552 being positioned between the fingerprint intersection point 551 of the specific finger 51' and the second phalangeal configuration intersection point 553, the second phalangeal configuration intersection point 553 being positioned between the third phalangeal configuration intersection point 554 and the first phalangeal configuration intersection point 552, the third phalangeal configuration intersection point 554 being positioned between the adjacent second and third trough points 542, 543, the first major line intersection point 555 being positioned on the palm 53 corresponding to the third phalangeal configuration intersection point 554 above, the second major line intersection point 556 being positioned between the first major line intersection point 555 and the third major line intersection point 557, the third major line intersection point 557 being correspondingly positioned under the second major line intersection point 556; and S5. the processor calculating and processing the distances between the intersection points to generate multiple characteristic points and converting the characteristic points into digitalized characteristic data to compare the characteristic data with the characteristic data stored in a characteristic database to generate a comparison result, the processor 2 calculating and processing the distances between the intersection points, for example, a first distance being defined between the fingerprint intersection point 551 and the first phalangeal configuration intersection point 552, a second distance being defined between the first and second phalangeal configuration intersection points 552, 553, a third distance being defined between the second and third phalangeal configuration intersection points 553, 554, a fourth distance being defined between the third phalangeal configuration intersection point 554 and the first major line intersection point 555, a fifth distance being defined between the first and second major line intersection points 555, 556, a sixth distance being defined between the second and third major line intersection points 556, 557 to generate the characteristic points corresponding to the distances, that is, the first, second, third, fourth, fifth and sixth distances respectively corresponding to the first, second, third, fourth, fifth and sixth characteristic points 561, 562, 563, 564, 565, 566, the processor 2 then converting the characteristic points into digitalized characteristic data such as binary, octal, decimal, hexadecimal or other positional notation (such as quinary or standing-on-nines carry) digital characteristic data and then compare the characteristic data with the corresponding characteristic data stored in the characteristic database 7 to generate the comparison result, in case the comparison result is matched, this meaning the identity of the user 4 is proved, in case the comparison result is not matched, this meaning the identity of the user 4 is not proved.

According to the above, by means of the design of the fingerprint and palmprint identification method of the present invention, the whole palm of the hand 41 of the user 4 can 360-degree non-directionally directly contact and place on the fingerprint and palmprint identification device 1 to quickly identify the whole fingerprint and palmprint. Moreover, it is only necessary to ensure that the specific finger 51' (such as the middle finger) is pressed against the contact face 12 of the fingerprint and palmprint identification device 1, while the rest fingers 51 and the palm 53 can be freely non-directionally pressed against the contact face 12 so that the use of the fingerprint and palmprint identification device 1 is quite convenient. In addition, by means of the fingerprint and palmprint identification method of the present invention, the identification degree (or the identification precision) can be effectively increased and the security can be effectively enhanced. Also, the cost can be effectively saved and the identification comparison time can be shortened.

Please now refer to FIG. 6 and supplementally to FIGS. 1, 3A and 3B. The non-directional fingerprint and palmprint data creation method of the present invention is applied to the fingerprint and palmprint identification device 1 of the present invention. When a user 4 initially sets up his/her own whole palm (the fingerprints and the palmprint) of the hand 41 into the characteristic database 7, by means of the fingerprint and palmprint data creation method of the present invention, the characteristic data corresponding to the fingerprints and the palmprint of the whole palm of the initial user 4 can be set up and stored in the characteristic database 7. The steps S1-S4 of the fingerprint and palmprint data creation method of the present invention are identical to the steps S1-S4 of the fingerprint and palmprint identification method of the present invention and thus will not be redundantly described hereinafter. In the step S5 of the fingerprint and palmprint data creation method of the present invention, the processor calculates and processes the distances between the intersection points to generate multiple characteristic points corresponding to the distances, (that is, the first, second, third, fourth, fifth and sixth distances respectively correspond to the first, second, third, fourth, fifth and sixth characteristic points 561, 562, 563, 564, 565, 566). The processor 2 then converts the characteristic points into digitalized characteristic data. This is identical to the step S5 of the fingerprint and palmprint identification method of the present invention. The only difference is that in the step S5 of the fingerprint and palmprint data creation method of the present invention, the processor 2 then stores the digitalized characteristic data into a characteristic database 7 for storage or reading and use.

The processor 2 converts the characteristic points into digitalized characteristic data such as binary, octal, decimal, hexadecimal or other positional notation (such as quinary or standing-on-nines carry) digital characteristic data and then stores the digitalized characteristic data into the characteristic database 7 for storage or reading and use. Accordingly, the characteristic data of the fingerprints 511 and the palmprint 531 of the hand 41 of the initial user 4 are set up.

Accordingly, by means of the design of the fingerprint and palmprint data creation method of the present invention, the whole palm of the hand 41 of the user 4 can 360-degree non-directionally directly contact and place on the fingerprint and palmprint identification device 1 to quickly identify the whole fingerprint and palmprint. Moreover, it is only necessary to ensure that the specific finger 51' (such as the middle finger of the left palm or right palm) is pressed against the contact face 12 of the fingerprint and palmprint identification device 1, while the rest fingers 51 and the palm 53 can be freely non-directionally pressed against the contact face 12 and the rest fingers 51 can get together or open from each other without limitation of opening angle of the fingers 51. Therefore, the use of the fingerprint and palmprint identification device 1 is quite convenient. In addition, by means of the fingerprint and palmprint data creation method of the present invention, the identification degree (or the identification precision) can be effectively increased and the security can be effectively enhanced. Also, the cost can be effectively saved and the identification comparison time can be shortened.

Figure 7A:
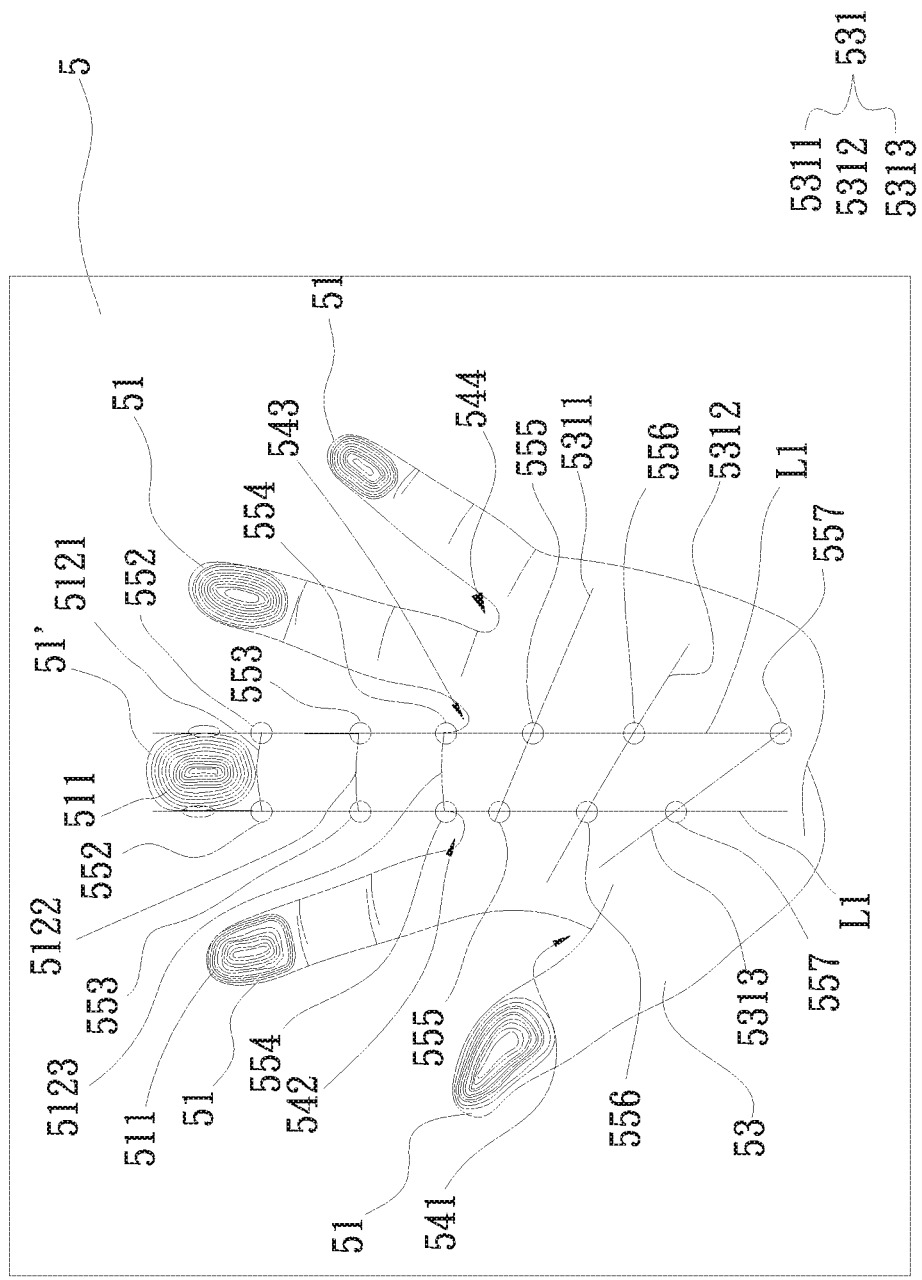
FIG. 7A is a view showing that in a second embodiment of the fingerprint and palmprint identification method of the present invention, the intersection points and the characteristic points of the fingerprint and palmprint image are selected.
Figure 7B:
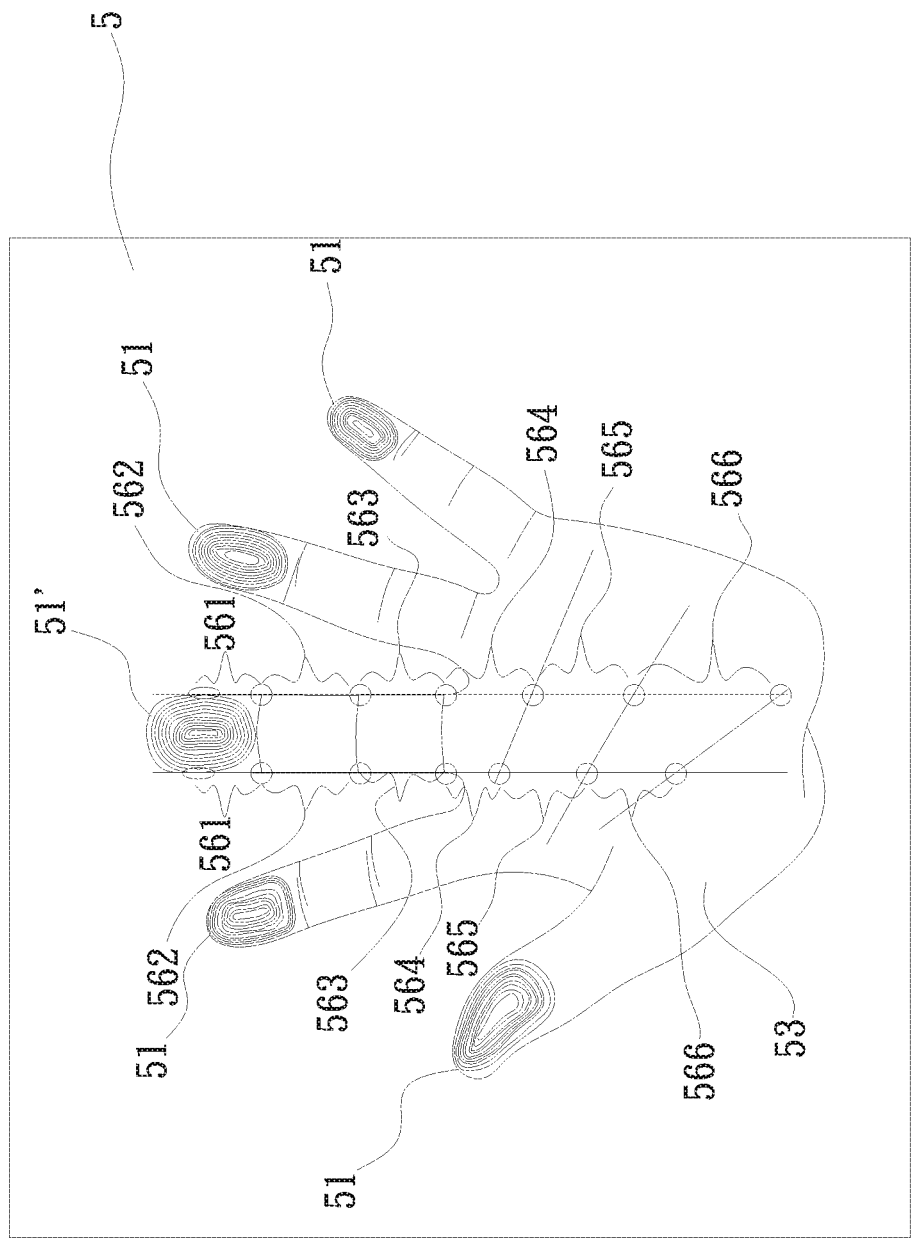
FIG. 7B is a view showing that in the second embodiment of the fingerprint and palmprint identification method of the present invention, the intersection points and the characteristic points of the fingerprint and palmprint image are selected.

Please now refer to FIGS. 7A, 7B and 8. FIG. 7A is a view showing that in a second embodiment of the fingerprint and palmprint identification method of the present invention, the intersection points and the characteristic points of the fingerprint and palmprint image are selected. FIG. 7B is a view showing that in the second embodiment of the fingerprint and palmprint identification method of the present invention, the intersection points and the characteristic points of the fingerprint and palmprint image are selected. FIG. 8 is a flow chart of the second embodiment of the fingerprint and palmprint identification method of the present invention. The second embodiment of the fingerprint and palmprint identification method of the present invention is substantially identical to the first embodiment and thus will not be redundantly described hereinafter. The second embodiment is mainly different from the first embodiment in that there are multiple reference lines L1, not one reference line L1 on the specific finger 51'. That is, the steps S1-S2 of the fingerprint and palmprint identification method in the second embodiment are identical to the steps S1-S2 of the first embodiment and thus will not be redundantly described hereinafter. The difference is that the second embodiment includes steps:

S3. the processor identifying and calculating the fingerprint and palmprint image to obtain a trough point between each two fingers of the fingerprint and palmprint image and according to the trough point, the processor identifying and taking out a specific finger between two adjacent trough points of the fingerprint and palmprint image and selecting multiple reference lines on the specific finger, which extend to bottom end of the palm, the processor 2 identifying and calculating the fingerprint and palmprint image 5 to obtain the trough points between each two fingers 51 of the fingerprint and palmprint image 5, the trough points including a first trough point 541, a second trough point 542, a third trough point 543 and a fourth trough point 544, the trough points of this embodiment being identical to the trough points of the first embodiment and thus will not be redundantly described hereinafter, according to the trough points, the processor 2 identifying and taking out a specific finger 51' (such as the middle finger of the hand 41) between the second and third trough points 542, 543 of the fingerprint and palmprint image 5 and selecting the reference lines L1 on the specific finger 51', which extend from two sides of the tip of the specific finger 51' to the bottom end of the palm 53, in this embodiment, there being two reference lines L1 extending from the two sides of the specific finger 51' of the hand 41 to the bottom end of the palm 53 of the hand 41 in the fingerprint and palmprint image 5;

S4. the processor identifying and calculating the fingerprint and palmprint image to obtain the fingerprint of the specific finger and the palmprint and according to the reference lines and the fingerprint and multiple phalangeal configurations of the specific finger and multiple major lines of the palmprint, the processor identifying and processing the intersection points to generate multiple intersection points, the processor 2 then identifying and calculating the fingerprint and palmprint image 5 to obtain the fingerprint 511 of the specific finger 51' and the palmprint 531 of the hand 41 in the fingerprint and palmprint image 5, according to the fingerprint 511 of the specific finger 51' intersecting the reference line L1 and the multiple phalangeal configurations of the specific finger 51' and the multiple major lines of the palmprint 531 in the fingerprint and palmprint image 5, the processor 2 identifying and processing the intersection points to generate the intersection points, the phalangeal configurations of the specific finger 51' of this embodiment being identical to the phalangeal configurations of the specific finger 51' of the first embodiment and thus will not be redundantly described hereinafter, in addition, the intersection points including two opposite fingerprint intersection points 551, two opposite first phalangeal configuration intersection points 552, two opposite second phalangeal configuration intersection points 553, two opposite third phalangeal configuration intersection points 554, two opposite first major line intersection points 555, two opposite second major line intersection points 556 and two opposite third major line intersection points 557, the first phalangeal configuration intersection points 552 being positioned between the fingerprint intersection points 551 of the specific finger 51' and the second phalangeal configuration intersection points 553, the second phalangeal configuration intersection points 553 being positioned between the third phalangeal configuration intersection points 554 and the first phalangeal configuration intersection points 552, the third phalangeal configuration intersection points 554 being positioned between the adjacent second and third trough points 542, 543, the first major line intersection points 555 being positioned on the palm 53 corresponding to the third phalangeal configuration intersection points 554 above, the second major line intersection points 556 being positioned between the first major line intersection points 555 and the third major line intersection points 557, the third major line intersection points 557 being correspondingly positioned under the second major line intersection points 556; and S5. the processor calculating and processing the distances between the intersection points to generate multiple characteristic points and converting the characteristic points into digitalized characteristic data to compare the characteristic data with the characteristic data stored in a characteristic database to generate a comparison result, the processor 2 calculating and processing the distances between the intersection points, for example, a first distance being defined between the two opposite fingerprint intersection points 551 and the two opposite corresponding first phalangeal configuration intersection points 552, a second distance being defined between the two opposite first and second phalangeal configuration intersection points 552, 553, a third distance being defined between the two opposite second and third phalangeal configuration intersection points 553, 554, a fourth distance being defined between the two opposite third phalangeal configuration intersection point 554 and the two opposite corresponding first major line intersection points 555, a fifth distance being defined between the two opposite first and second major line intersection points 555, 556, a sixth distance being defined between the two opposite second and third major line intersection points 556, 557 to generate the characteristic points corresponding to the distances, that is, the two opposite first, second, third, fourth, fifth and sixth distances respectively corresponding to the two opposite corresponding first, second, third, fourth, fifth and sixth characteristic points 561, 562, 563, 564, 565, 566, the processor 2 then converting the characteristic points into digitalized characteristic data such as binary, octal, decimal, hexadecimal or other positional notation (such as quinary or standing-on-nines carry) digital characteristic data and then compare the characteristic data with the corresponding characteristic data stored in the characteristic database 7 to generate the comparison result, in case the comparison result is matched, this meaning the identity of the user 4 is proved, in case the comparison result is not matched, this meaning the identity of the user 4 is not proved.

In a modified embodiment, in the step S5, the processor 2 calculates and processes the distances between the intersection points and a width defined between the reference lines L1 marked on two sides of the specific finger 51' to generate multiple characteristic points corresponding to the distances and a width characteristic point corresponding to the width. The processor 2 then converts the characteristic points and the width characteristic point into digitalized characteristic data to compare the characteristic data with the corresponding characteristic data stored in the characteristic database 7 to generate the comparison result. By means of the fingerprint and palmprint identification method of the present invention, the identification degree (or the identification precision) can be effectively increased and the security can be effectively enhanced.

In addition, please refer to FIG. 9 and supplementally to FIGS. 7A and 7B. The steps S1-S4 of the second embodiment of the fingerprint and palmprint data creation method of the present invention are identical to the steps S1-S4 of the second embodiment of the fingerprint and palmprint identification method of the present invention and thus will not be redundantly described hereinafter. In the step S5 of the second embodiment of the fingerprint and palmprint data creation method of the present invention, the processor 2 calculates and processes the distances between the intersection points to generate multiple characteristic points corresponding to the distances, (that is, the two opposite first, second, third, fourth, fifth and sixth distances respectively correspond to the two opposite first, second, third, fourth, fifth and sixth characteristic points 561, 562, 563, 564, 565, 566). The processor 2 then converts the characteristic points into digitalized characteristic data. This is identical to the step S5 of the second embodiment of the fingerprint and palmprint data creation method of the present invention. The only difference is that in the step S5 of the second embodiment of the fingerprint and palmprint data creation method of the present invention, the processor 2 then stores the digitalized characteristic data into a characteristic database 7 for storage or reading and use.

Accordingly, by means of the design of the fingerprint and palmprint data creation method of the present invention, the fingerprints and the palmprint of the whole palm of the hand can be non-directionally quickly identified. Also, the use of the fingerprint and palmprint identification device is quite convenient. In addition, the cost can be saved and the identification comparison time can be shortened.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A non-directional fingerprint and palmprint identification method comprising steps of:
    using a fingerprint and palmprint identification device to detect and scan the fingerprints and palmprint of a user to generate a fingerprint and palmprint image and transmit the image to a processor;
    the processor processing the fingerprint and palmprint image to generate a processed fingerprint and palmprint image;
    the processor identifying and calculating the fingerprint and palmprint image to obtain trough points between each two fingers of the fingerprint and palmprint image, wherein the trough points include a first trough point, a second trough point, a third trough point and a fourth trough point, according to the trough points;
    the processor identifying and calculating the fingerprint and palmprint image to obtain the fingerprint of the specific finger and the palmprint and according to the at least one reference line and the fingerprint of the specific finger and the palmprint, the processor identifying and processing the intersection points to generate multiple intersection points; and
    the processor calculating and processing the distances between the intersection points to generate multiple characteristic points and converting the characteristic points into digitalized characteristic data to compare the characteristic data with the characteristic data stored in a characteristic database to generate a comparison result, the processor identifying and taking out a specific finger between the second and third trough points of the fingerprint and palmprint image and selecting the reference line on the specific finger, which extends from the middle of a tip of the specific finger to the bottom end of the palm.

2. The non-directional fingerprint and palmprint identification method as claimed in claim 1, wherein the fingerprint and palmprint identification device has multiple sensors and a contact face, the contact face being a plane face or a curved face, the contact face being disposed on one face of the fingerprint and palmprint identification device for a hand of a user to put on, attach to and contact the contact face, whereby the hand of the user can non-directionally attach to and contact the contact face, the sensors being disposed on the fingerprint and palmprint identification device and electrically connected to the processor, the sensors serving to detect and scan the fingerprints and palmprint of the hand of the user in contact with the contact face to generate the fingerprint and palmprint image, the sensors being capacitor fingerprint and palmprint sensors.

3. The non-directional fingerprint and palmprint identification method as claimed in claim 1, wherein according to the reference line and the fingerprint and multiple phalangeal configurations of the specific finger and multiple major lines of the palmprint, the processor identifies and processes the intersection points to generate the intersection points.

4. The non-directional fingerprint and palmprint identification method as claimed in claim 3, wherein the intersection points include a fingerprint intersection point, a first phalangeal configuration intersection point, a second phalangeal configuration intersection point, a third phalangeal configuration intersection point and a first major line intersection point, the first phalangeal configuration intersection point being positioned between the fingerprint intersection point of the specific finger and the second phalangeal configuration intersection point, the second phalangeal configuration intersection point being positioned between the third phalangeal configuration intersection point and the first phalangeal configuration intersection point, the first major line intersection point being positioned on the palm corresponding to the third phalangeal configuration intersection point above.

5. The non-directional fingerprint and palmprint identification method as claimed in claim 4, wherein the intersection points further include a second major line intersection point and a third major line intersection point, the second major line intersection point being positioned between the first major line intersection point and the third major line intersection point.

6. The non-directional fingerprint and palmprint identification method as claimed in claim 1, wherein the characteristic data are binary, octal, decimal or hexadecimal digital characteristic data.

7. The non-directional fingerprint and palmprint identification method as claimed in claim 1, wherein the fingerprint and palmprint identification device is a plane-face fingerprint and palmprint identification device or a flexible curved fingerprint and palmprint identification device.

8. The non-directional fingerprint and palmprint identification method as claimed in claim 1, wherein the trough points include a first trough point, a second trough point, a third trough point and a fourth trough point, according to the trough points, the processor identifying and taking out the specific finger between the second and third trough points of the fingerprint and palmprint image and selecting multiple reference lines on the specific finger, which extends from two sides of a tip of the specific finger to the bottom end of the palm.

9. The non-directional fingerprint and palmprint identification method as claimed in claim 8, wherein according to the reference lines and the fingerprint and multiple phalangeal configurations of the specific finger and multiple major lines of the palmprint, the processor identifies and processes the intersection points to generate the intersection points.

10. A non-directional fingerprint and palmprint data creation method comprising steps of:
using a fingerprint and palmprint identification device to detect and scan the fingerprints and palmprint of a user to generate a fingerprint and palmprint image and transmit the image to a processor;
the processor processing the fingerprint and palmprint image to generate a processed fingerprint and palmprint image;
the processor identifying and calculating the fingerprint and palmprint image to obtain trough points between each two fingers of the fingerprint and palmprint image, wherein the trough points include a first trough point, a second trough point, a third trough point and a fourth trough point and according to the trough points, the processor identifying and taking out a specific finger between the second and third trough points of the fingerprint and palmprint image and selecting reference line on the specific finger, which extends from the middle of a tip of the specific finger to the bottom end of the palm;
the processor identifying and calculating the fingerprint and palmprint image to obtain the fingerprint of the specific finger and the palmprint and according to the at least one reference line and the fingerprint of the specific finger and the palmprint, the processor identifying and processing the intersection points to generate multiple intersection points; and
the processor calculating and processing the distances between the intersection points to generate multiple characteristic points and converting the characteristic points into digitalized characteristic data and storing the digitalized characteristic data into a characteristic database for storage or reading and use.

11. The non-directional fingerprint and palmprint data creation method as claimed in claim 10, wherein the fingerprint and palmprint identification device has multiple sensors and a contact face, the contact face being a plane face or a curved face, the contact face being disposed on one face of the fingerprint and palmprint identification device for a hand of a user to put on, attach to and contact the contact face, whereby the hand of the user can non-directionally attach to and contact the contact face, the sensors being disposed on the fingerprint and palmprint identification device and electrically connected to the processor, the sensors serving to detect and scan the fingerprints and palmprint of the hand of the user in contact with the contact face to generate the fingerprint and palmprint image, the sensors being capacitor fingerprint and palmprint sensors.

12. The non-directional fingerprint and palmprint data creation method as claimed in claim 10, wherein according to the reference line and the fingerprint and multiple phalangeal configurations of the specific finger and multiple major lines of the palmprint, the processor identifies and processes the intersection points to generate the intersection points.

13. The non-directional fingerprint and palmprint data creation method as claimed in claim 12, wherein the intersection points include a fingerprint intersection point, a first phalangeal configuration intersection point, a second phalangeal configuration intersection point, a third phalangeal configuration intersection point and a first major line intersection point, the first phalangeal configuration intersection point being positioned between the fingerprint intersection point of the specific finger and the second phalangeal configuration intersection point, the second phalangeal configuration intersection point being positioned between the third phalangeal configuration intersection point and the first phalangeal configuration intersection point, the first major line intersection point being positioned on the palm corresponding to the third phalangeal configuration intersection point above.

14. The non-directional fingerprint and palmprint data creation method as claimed in claim 13, wherein the intersection points further include a second major line intersection point and a third major line intersection point, the second major line intersection point being positioned between the first major line intersection point and the third major line intersection point.

15. The non-directional fingerprint and palmprint data creation method as claimed in claim 10, wherein the characteristic data are binary, octal, decimal or hexadecimal digital characteristic data.

16. The non-directional fingerprint and palmprint data creation method as claimed in claim 10, wherein the fingerprint and palmprint identification device is a plane-face fingerprint and palmprint identification device or a flexible curved fingerprint and palmprint identification device.

17. The non-directional fingerprint and palmprint data creation method as claimed in claim 10, wherein multiple reference lines on the specific finger, which extends from two sides of a tip of the specific finger to the bottom end of the palm are selected.

18. The non-directional fingerprint and palmprint data creation method as claimed in claim 17, wherein according to the multiple reference lines and the fingerprint and multiple phalangeal configurations of the specific finger and multiple major lines of the palmprint, the processor identifies and processes the intersection points to generate the intersection points.

\* \* \* \* \*